United States Patent [19]

Sydansk

[11] Patent Number: 5,415,229
[45] Date of Patent: May 16, 1995

[54] HYDROCARBON RECOVERY PROCESS UTILIZING A GEL PREPARED FROM A POLYMER AND A PREFORMED CROSSLINKING AGENT

[75] Inventor: Robert D. Sydansk, Littleton, Colo.

[73] Assignee: Marathon Oil Company, Findlay, Ohio

[21] Appl. No.: 176,735

[22] Filed: Jan. 3, 1994

[51] Int. Cl.$^6$ .......................................... E21B 33/138
[52] U.S. Cl. ..................... 166/295; 166/300; 507/903; 523/130
[58] Field of Search ............... 166/270, 294, 295, 300; 523/130; 507/903

[56] References Cited

U.S. PATENT DOCUMENTS

| | | | |
|---|---|---|---|
| 3,762,476 | 10/1973 | Gall | 166/294 |
| 4,683,949 | 8/1987 | Sydansk et al. | 166/270 |
| 4,706,754 | 11/1987 | Smith | 166/295 |
| 4,770,245 | 9/1988 | Sydansk | 166/295 |
| 4,917,186 | 4/1990 | Mumallah | 166/295 |
| 5,069,281 | 12/1991 | Tackett, Jr. | 166/295 |
| 5,131,469 | 7/1992 | Lockhart et al. | 166/295 |
| 5,143,958 | 9/1992 | Lockhart et al. | 524/219 |
| 5,181,568 | 1/1993 | Mckown et al. | 166/295 X |
| 5,219,475 | 6/1993 | Lockhart et al. | 252/8.551 |
| 5,219,476 | 6/1993 | Lockhart et al. | 252/8.551 |
| 5,338,465 | 8/1994 | Lockhart et al. | 166/295 X |

OTHER PUBLICATIONS

Lockhart et al., "A New Gelation Technology For In-Depth Placement of $Cr^{3+}$/Polymer Gels In High-Temperature Reservoirs," SPE/DOE 24194, Apr. 1992.

Lockhart et al., "Gelation-Delaying Additives For $Cr^{3+}$/Polymer Gels", SPE 25221, Mar. 1993.

*Primary Examiner*—George A. Suchfield
*Attorney, Agent, or Firm*—Jack L. Hummel; Jack E. Ebel

[57] ABSTRACT

A process and composition are provided for permeability reduction in a hydrocarbon-bearing formation to improve hydrocarbon recovery therefrom. The process includes placement of a crosslinked polymer gel in the treatment region preceded by surface preparation of a gelation solution which is the gel precursor. The gelation solution containing a crosslinkable polymer and chromium(III)/carboxylate complex crosslinking agent is prepared by preforming the crosslinking agent in isolation from the polymer and thereafter combining the crosslinking agent and polymer in solution. The starting materials for the complex crosslinking agent are an organic chromium(III) salt and a selected polycarboxylate or alpha-hydroxy carboxylate anion. The gel is placed in the treatment region by injecting the gelation solution into the formation, displacing it into the desired treatment region and gelling the solution to completion forming the permeability-reducing gel in situ.

27 Claims, No Drawings

HYDROCARBON RECOVERY PROCESS UTILIZING A GEL PREPARED FROM A POLYMER AND A PREFORMED CROSSLINKING AGENT

BACKGROUND OF THE INVENTION

1. Technical Field

The invention relates to a process for recovering hydrocarbons from a subterranean formation, and more particularly to a hydrocarbon recovery process using a permeability-reducing agent.

2. Background Information

The utility of crosslinked polymer gels as permeability-reducing agents in subterranean hydrocarbon-bearing formations to facilitate hydrocarbon recovery has long been known in the art. U.S. Pat. No. 3,762,476 to Gall is representative of conventional teaching in its time. Gall discloses a conformance improvement treatment process, wherein a permeability-reducing crosslinked polymer gel is formed in situ by sequential injection of the gel components. An aqueous slug containing a crosslinkable water-soluble polymer is injected into the subterranean treatment region followed by an aqueous slug containing a crosslinking agent made up of a polyvalent metal cation complexed with a retarding anion. Useful polyvalent metal cations listed in Gall include iron(II), iron(III), aluminum(III), chromium(III), calcium(II), and magnesium(II). Useful retarding anions complexed with the cation include citrate, phosphate, acetate, nitrilotriacetate, and tartrate.

Sequential injection of the gel components as separate and distinct slugs into the treatment region is essential to treatment processes such as Gall insofar as surface contacting of the polymer and crosslinking agent was believed to cause premature gelation of the gel components prior to reaching the treatment region. If prematurely formed at the surface or in the well bore, placement of the gels in the treatment region is difficult, if not impossible, to achieve. Consequently, sequential injection of the gel components in concept avoids premature gelation by delaying contacting of the gel components until they are displaced out into the treatment region of the formation.

In situ contacting of the polymer and crosslinking agent as required by Gall, nevertheless, is operationally unattractive in many hydrocarbon recovery applications because of the difficulty in achieving adequate mixing of the gel components in situ. Without adequate mixing, the gels of Gall are poorly formed, resulting in weak and unstable gels that perform ineffectively as permeability-reducing agents.

U.S. Pat. No. 3,926,258 to Hessert et al. offers an operational alternative to conformance improvement treatment processes such as Gall that effectuate gel formation by sequential injection of the gel components into the treatment region of the formation. The process of Hessert et al. enables mixing of the gel components at the surface to form a gelation solution that can be injected into the desired treatment region of the formation as a single slug. Thus, Hessert et al. overcomes the inherent operational limitations of processes that require in situ mixing of the gel components. Hessert et al. avoids premature gelation of the solution by specifying and carefully controlling the sequence and form in which the gel components are mixed at the surface to generate the gelation solution.

In accordance with Hessert et al., a gelation solution is prepared by initially forming an aqueous solution of a crosslinkable polymer and a multivalent metal cation such as chromium(VI). The metal cation is at an elevated, but reduceable, valence state at which the metal cation is substantially inert with respect to the polymer. A complexing agent is then added to the solution followed by a reducing agent. The reducing agent reduces the valence state of the metal cation to a valence state at which the metal cation is reactive with the polymer. The complexing agent, however, delays the crosslinking reaction between the polymer and reduced metal cation by complexing with the metal cation until the resulting gelation solution can be placed in the treatment region. Placement of the gelation solution, nevertheless, cannot be delayed inordinately once the reducing agent is added to the solution because the polymer competes with the complexes for the reduced metal cations.

Like Hessert et al., U.S. Pat. No. 4,683,949 to Sydansk et al. discloses a conformance improvement treatment whereby a gelation solution is formed in its entirety at the surface before the solution is injected as a homogeneous slug into a desired treatment region. Sydansk et al. is specifically predicated on the finding that gelation solutions prepared entirely at the surface from a chromium(III)/carboxylate complex crosslinking agent and a crosslinkable polymer produce gels that are uniquely stable and have highly predictable gel strengths and gelation times. The gels are capable of practical long-term placement in subterranean treatment regions, even in hostile environments. Unlike Hessert et al., however, Sydansk et al. is not specific with respect to the method of preparing the gelation solution at the surface. Sydansk et al. teaches alternative methods of preparing the gelation solution, but ascribes no criticality to the particular sequence of preparation. Sydansk et al. is preferentially directed to the ultimate composition of the gelation solution at the surface rather than the method of preparation.

U.S. Pat. Nos. 5,131,469 and 5,143,958 to Lockhart et al. disclose a preferential embodiment for preparing complex crosslinking agents of the type described by Sydansk et al. in conjunction with preparing gelation solutions at the surface having utility in conformance improvement treatments. According to the preferred embodiment of the Lockhart et al. patents, chromium(III)/carboxylate complex crosslinking agents are prepared by adding an inorganic chromium(III) salt and an acid or salt form of a designated carboxylate ligand directly to an aqueous solution of a crosslinkable polymer at the surface. In doing so, the complex crosslinking agent and gelation solution are generated simultaneously for injection into the desired treatment region. According to an alternate embodiment of the Lockhart et al. patents, the complex crosslinking agent is preformed ahead of the gelation solution by combining the inorganic chromium(III) salt and the acid or salt form of the carboxylate ligand absent the polymer. The polymer is subsequently added to the preformed complex crosslinking agent in solution to form the gelation solution.

Notwithstanding the teaching of the Hessert et al. and Lockhart et al. patents, a need exists for additional means of preparing chromium(III)/carboxylate complex crosslinking agents and resultant gelation solutions insofar as it may not always be desirable to form the complex crosslinking agent in the presence of the polymer as required by Hessert et al. Furthermore, the use of chromium(VI) in field applications may be undesirable because chromium(VI) is a regulated material having potential toxicity to the environment. It is also apparent that the inorganic chromium(III) salt starting material required by the Lockhart et al. patents may be undesirable for preforming or otherwise preparing complex crosslinking agents because the inorganic chromium(III) salts taught therein are not always abundantly available in the field in the required quantities and the inorganic chromium(III) salts are more highly regulated and more corrosive than organic chromium(III) salts.

It is, therefore, an object of the present invention to provide a gelation solution composition at the surface that matures into a crosslinked polymer gel for permeability reduction of a subterranean hydrocarbon-bearing formation. It is another object of the present invention to provide a process for preparing the gelation solution at the surface. It is a further object of the present invention to provide such a process for preparing the gelation solution utilizing starting materials alternate those taught by the prior art. In particular, it is an object of the present invention to provide such a process for preparing the gelation solution utilizing starting materials less corrosive than those taught by the prior art. It is yet another object of the present invention to provide such a process for preparing the gelation solution utilizing starting materials that are for the most part readily available in the field.

SUMMARY OF THE INVENTION

The present invention is a process and composition for improving hydrocarbon recovery from a subterranean hydrocarbon-bearing formation penetrated by a well bore. Improved hydrocarbon recovery is effectuated in accordance with the invention by employing a specific composition to reduce permeability within a desired treatment region of a subterranean formation penetrated by a fluid injection well bore or a hydrocarbon production well bore. Encompassed within the scope of the invention are conformance improvement treatment, cloning treatment, fluid shutoff treatment, and squeeze cement treatment applications.

The permeability-reducing composition is used in a conformance improvement treatment to reduce the permeability of a high permeability region in the formation. The treatment particularly improves vertical and areal conformance within the formation and correspondingly improves flow profiles and sweep efficiencies of injected or produced fluids in the formation. The treatment can also prevent the diversion of injected fluids away from a hydrocarbon-producing zone into adjacent thief zones of or proximate to the formation.

The permeability-reducing composition is used in a coning treatment to selectively block the flow of unwanted fluids into a hydrocarbon-producing zone of the formation from a second proximate zone or formation, such as from an underlying aquifer. Alternatively, the coning treatment selectively blocks the flow of unwanted fluids into the hydrocarbon-producing zone from an overlying gas cap. Typically, the proximate zone or formation being partially or completely isolated from the hydrocarbon-producing zone contains producible, but unwanted, fluids such as water or gas. The coning treatment prevents or reduces intrusion of the unwanted fluids into the hydrocarbon producing zone under a water or gas coning mechanism.

The permeability-reducing composition is used in a squeeze cement treatment to shut off and abandon a zone of the formation in direct communication with the well bore penetrating the formation or to shut off a volume proximate to the well bore. Squeeze cementing enables essentially total fluid shutoff of the abandoned zone or proximate volume so that the well bore can be recompleted or reconfigured for more effective post-treatment utilization. The permeability-reducing composition can also be used in a squeeze cement treatment to remediate small well bore leaks including casing leaks by shutting off small openings or annuli in or along the well bore.

The permeability-reducing composition is used in a fluid shutoff treatment to reduce the undesirable flow of a liquid or gas within a formation. Oftentimes the fluid shutoff treatment is used to reduce the undesirable entry of water or gas into a well bore. In some cases the fluid shutoff treatment is employed in a production weal bore to reduce the volume of water entering the well bore via channeling. Such fluid shutoff treatments may be particularly useful in reducing the flow of fluids from an injection well bore into the production well bore.

The present process, in each of its above-recited applications, requires placement of a crosslinked polymer gel in a desired treatment region of the formation to act as a permeability-reducing agent therein. Placement of the gel is preceded by preparation of a gelation solution at the surface which is a precursor to the gel. The gelation solution contains a crosslinkable polymer, a chromium(III)/carboxylate complex crosslinking agent, and an aqueous solvent. In a further embodiment, the present invention is the composition of the above-recited gelation solution.

The gelation solution is prepared by preforming the crosslinking agent in isolation from the polymer and thereafter combining the crosslinking agent and polymer in solution. The starting materials for the crosslinking agent are an organic chromium(III) salt and a desired carboxylate species. The starting materials are initially combined in solution. The chromium(III) species of the organic chromium(III) salt preferentially complexes with the desired carboxylate species on contact to form the crosslinking agent in solution. Once the crosslinking agent is preformed in solution, the gelation solution may be formed at any time by adding the crosslinking agent to the polymer.

The gel is placed in the desired treatment region by injecting the above-described gelation solution as a homogeneous slug into the hydrocarbon-bearing formation via a well bore in fluid communication therewith. The gelation solution is displaced into the desired treatment region and gelled to completion forming a permeability-reducing gel therein.

DESCRIPTION OF PREFERRED EMBODIMENTS

A number of specific terms are used throughout the specification to describe the process of the present invention and are defined as follows. A "subterranean hydrocarbon-bearing formation" is a subterranean geological structure consisting essentially of "matrix," and in some instances, "anomalies." The term "subterranean hydrocarbon-bearing formation" is synonymous with the term "reservoir." An "anomaly" is a volume within a formation having a very high permeability relative to the matrix. The term "anomaly" is inclusive of such highly permeable volumes as fractures, fracture networks, joints, cracks, fissures, vugs, voids, solution channels, caverns, washouts, cavities, and the like. The "matrix" is generally characterized as substantially continuous, sedimentary geological material having a very low permeability relative to an anomaly. In addition, the matrix is often characterized as competent.

The term "well bore" is defined as a bore hole extending from the earth surface to the subterranean hydrocarbon-bearing formation. Thus, a well bore is a conduit providing fluid communication between the surface and the subterranean hydrocarbon-bearing formation penetrated thereby. A production well bore enables the removal of fluids from the subterranean hydrocarbon-bearing formation to the surface and an injection well bore enables the placement of fluids into the subterranean hydrocarbon-bearing formation from the surface. It is noted that a given well bore can function interchangeably as a production well bore or an injection well bore depending on whether a fluid is being removed from or placed in the well bore. The term "well" is synonymous with the term "well bore." "Fluid flow capacity" is the degree to which porous media facilitates or, conversely, resists fluid flow. Other terms used herein have definitions in accordance with the conventional usage of a skilled artisan, unless otherwise defined hereafter.

The process of the present invention comprises preparing a flowing liquid gelation solution at the earthen surface, injecting the gelation solution into a subterranean hydrocarbon-bearing formation via a well bore in fluid communication therewith, displacing the gelation solution into a desired treatment region of the formation and gelling the solution in situ, thereby placing a permeability-reducing gel in the treatment region. As such, the gelation solution is a gel precursor that is transformable from the flowing liquid solution to the gel after being aged to maturity for a predetermined gel time. A "gel" is defined herein as a continuous three-dimensional crosslinked polymeric network integrating a liquid into the interstices of the network. A gel having a sufficient degree of network structure can be characterized as non-flowing, while a gel with a lower degree of structure is characterized as flowing although more resistant to flow than the precursor gelation solution.

The gelation solution comprises a crosslinkable polymer and a crosslinking agent in solution within an aqueous solvent. Crosslinkable polymers are well known in the art and any such water-soluble carboxylate-containing polymer, whether a biopolymer or a synthetic polymer, has utility in the gelation solutions of the present invention. Examples of water-soluble carboxylate-containing biopolymers having utility herein include polysaccharides and modified polysaccharides, such as xanthan gum, guar gum, succinoglycan, scleroglycan, polyvinylsaccharides, carboxymethylcellulose, o-carboxychitosans, hydroxyethylcellulose, hydroxypropylcellulose, modified starches, and chemically modified derivatives thereof.

Water-soluble carboxylate-containing synthetic polymers having utility herein are preferably acrylamide polymers. Acrylamide polymers are polymers having one or more acrylamide groups and include homopolymers of acrylamide, i.e., polyacrylamide (PA) and partially hydrolyzed polyacrylamide (PHPA). Acrylamide polymers, as defined herein, also include copolymers, terpolymers and tetrapolymers of acrylamide. Exemplary copolymers include copolymers of acrylamide and acrylate and copolymers with AMPS or vinylpyrolidone.

PA, has from about 0% to about 3% of its amide groups hydrolyzed. Although 0% hydrolyzed PA initially lacks any carboxylate groups, the PA generates carboxylate groups through autohydrolysis under the conditions of the present process, thereby satisfying the definition of carboxylate-containing polymers having utility within the scope of the present invention. PHPA has greater than about 3% of its amide groups hydrolyzed. The average molecular weight of an acrylamide polymer having utility herein is generally in a range between about 10,000 and about 50,000,000, preferably between about 150,000 and about 30,000,000, and most preferably between about 200,000 and about 25,000,000.

Crosslinking agents having utility in the present gelation solution are water-soluble complexes containing a chromium(III) cation and a polycarboxylate anion or an alpha-hydroxy carboxylate anion or substituted derivatives thereof. The term "polycarboxylate anion" as used herein encompasses anions having two or more carboxylate groups such as malonate, tartrate and citrate. The term "alpha-hydroxy carboxylate anion" encompasses anions having a carboxylate group and a hydroxy group in the alpha position and includes such compounds as lactate, glycolate and salicylate. It is understood the complexes containing mixtures of polycarboxylate or alpha-hydroxy carboxylate anions with other carboxylate anions such as acetate are within the scope of the present invention. It is further understood that complexes containing substituted derivatives of polycarboxylate or alpha-hydroxy carboxylate anions such as benzoyl glycolate are within the scope of the present invention.

The polycarboxylate and alpha-hydroxy carboxylate anions are generally obtained from the corresponding carboxylic acids or carboxylate salts. Thus, for example, malonate anions having utility herein are obtained from malonic acid, ammonium malonate, potassium malonate, sodium malonate, or the like. Preferred carboxylate salts, from which the carboxylate anions are obtained, are salts of mono- or poly- valent cations. The chromium(III) cation is obtained in a manner described hereafter from an organic chromium(III) salt, wherein the organic anion of the organic salt differs from the retarding carboxylate anion incorporated into the crosslinking agent complex. Included within the definition of the term "organic chromium(III) salt" as used herein are complexes containing the chromium(III) cation and the organic anion. The preferred anion of the organic salt is acetate as may be found in solid $CrAc_3$, solid $CrAc_3 \cdot H_2O$, solid $Cr_3Ac_7(OH)_2$ or a solution labeled "Chromic Acetate 50% Solution" that is commercially available, for example, from McGean Chemical Co., Inc., 1250 Terminal Tower, Cleveland, Ohio 44113, U.S.A.

It is apparent that the process and composition of the present invention is particularly advantageous where commercial supplies of the chromium(III)/acetate complex crosslinking agent are abundantly available in the field, but it is desirable to employ another chromium(III)/carboxylate complex crosslinking agent containing at least one carboxylate anion that is a stronger ligand than acetate.

The aqueous solvent of the gelation solution is substantially any aqueous liquid capable of forming a solution with the selected polymer and complex crosslinking agent. The term "solution" as used herein, in addition to true solutions, is intended to broadly encompass dispersions, emulsions, or any other homogeneous mixture of the gelation solution components in the aqueous solvent. The solvent is preferably either a fresh water or a brine, such as sea water or a produced water from the subterranean formation. Produced water can be advantageous because of its low-cost availability and because it enables the practitioner to return the produced water to the formation, thereby eliminating disposal thereof.

The gelation solution is prepared by preforming the crosslinking agent in isolation from the polymer and thereafter admixing the polymer and preformed crosslinking agent in solution at the surface to form a homogeneous injectable fluid. The crosslinking agent is preformed from starting materials comprising an organic chromium(III) salt and a selected carboxylate anion corresponding to the desired carboxylate anion of the resulting complex. As noted above, the preferred organic chromium(III) salt is a chromium(III) acetate such as chromium(III) triacetate. The selected carboxylate anion is a polycarboxylate such as malonate, tartrate or citrate or an alpha-hydroxy carboxylate such as lactate, glycolate or salicylate, or a substituted derivative thereof. The selected carboxylate anion may be in either its salt or acid form. The starting materials are combined in solution and the chromium(III) species of the organic chromium(III) salt preferentially complexes with the selected carboxylate anion on contact because the selected carboxylate anions are stronger ligands toward the chromium(III) cation. The product is the chromium(III)/carboxylate complex crosslinking agent of the present invention.

The chromium(III)/carboxylate complex crosslinking agent preformed in accordance with the above-described embodiment can be used immediately thereafter in preparation of the gelation solution or can be stored in solution or in added solid form for an extended time period prior to preparation of the gelation solution. The preformed crosslinking agent, however, is preferably aged in solution for at least four hours and more preferably 24 hours before it is used. The gelation solution is formed by surface admixing the polymer and preformed crosslinking agent in solution. Surface admixing broadly encompasses batch mixing the preformed crosslinking agent and polymer in bulk and subsequently injecting the resulting gelation solution into the well bore or mixing the preformed crosslinking agent and polymer in-line near the well head and injecting the gelation solution into the well bore. In any of the above-recited sequences, the solute components can be mixed dry, subsequently adding the aqueous solvent thereto, or the solute components can preferably be mixed while in solution with the aqueous solvent.

The polymer concentration of the resulting gelation solution is generally at least about 300 ppm, preferably at least about 1,000 ppm, and most preferably within a range between about 2,000 ppm and about 100,000 ppm. The chromium(III) cation concentration in solution is generally between about 10 and about 20,000 ppm, and preferably between about 20 and about 4000 ppm. The molar ratio of carboxylate anions to chromium(III) cations in the gelation solution is preferably between about 0.5:1 and about 100:1, more preferably between about 3:1 and 30:1, and most preferably greater than 3:1.

The gelation solution of the present invention has utility in substantially any permeability-reduction treatment related to hydrocarbon recovery. Permeability-reduction treatments can be alternatively termed fluid flow capacity-reduction treatments, and include conformance improvement treatments, coning treatments, fluid shutoff treatments, and squeeze cement treatments.

In the practice of a conformance improvement treatment, the gelation solution is injected into a well bore penetrating the subterranean hydrocarbon-bearing formation. Although, the well bore can be either an injection or a production well bore, it is often an injection well bore in conformance improvement treatment applications. The gelation solution is displaced from the well bore into the desired treatment region that is often a zone (also termed a horizontal stratum) containing higher permeability matrix proximate to the lower permeability hydrocarbon producing zone. The treatment region can alternatively be a high permeability anomaly, such as fractures, in the hydrocarbon producing zone or a zone proximate thereto. The crosslinking agent of the gelation solution effectuates crosslinking between appropriate sites of the same or other polymer molecules to create the network structure of the gel. The terms "crosslinking", "gelling" and "gelation" are used synonymously herein.

Partial crosslinking of the polymer by the crosslinking agent may occur in the gelation solution before the solution reaches the treatment region, but complete crosslinking resulting in gel formation preferably does not occur until at least a substantial portion of the gelation solution is in place in the treatment region.

The conditions of the treatment region influence the selection of a specific composition for the gelation solution. In general, placement of a gel in less permeable matrix preferentially dictates selection of a gel having relatively limited structure. The degree of structure of the gel formulated in the manner of the present invention is inter alia a function of the polymer properties, the polymer concentration, and the degree and character of crosslinking in the gelation solution.

In general, the degree of structure of a gel containing an acrylamide polymer is increased by increasing the polymer or crosslinking agent concentration of the gelation solution. However, a more cost-effective and oftentimes preferred means for achieving the same effect at a relatively fixed polymer concentration is to employ a higher molecular weight polymer or, in some cases, a polymer having a higher degree of hydrolysis. Conversely, a reduction in the degree of structure is achieved by using a lower molecular weight polymer or, in some cases, a polymer having a lower degree of hydrolysis. Thus, the skilled practitioner can modify the degree of structure of the present gel in the above-described manner to correspond with the permeability of the treatment region.

In any case, complete crosslinking is achieved when either substantially all of the crosslinking agent or substantially all of the polymer crosslinking sites are consumed as the gelation solution is aged. Prior to complete crosslinking, the gelation solution is deemed flowing to the extent it is readily displacable from the well bore and through the formation. After complete crosslinking, the gelation solution is fully transformed to a gel that is at least more resistant to flow than the gelation solution and in many cases is non-flowing to the extent it has sufficient strength to resist propagation from the treatment region during subsequent hydrocarbon recovery operations.

Upon complete crosslinking, or complete gelling as it is alternatively termed, a sufficient volume of the newly-formed gel resides in place within the treatment region to reduce the fluid flow capacity and correspondingly the permeability thereof. Consequently, hydrocarbon recovery fluids subsequently injected into the formation more uniformly sweep the hydrocarbon producing zone in preference to the treatment region. It is additionally noted that the gel produced in accordance with the present invention substantially retains its stability when contacted by liquid hydrocarbons within the formation and has a relatively high structural strength. Furthermore, flowing gels produced hereby typically exhibit a relatively low mobility for flow, while non-flowing gels produced hereby typically exhibit a yield pressure greater than injection or production pressures that are commonly encountered during oil production, thereby enabling the gel to remain in place throughout the production life of the subterranean hydrocarbon-bearing formation. The "yield pressure" is defined herein as the maximum pressure that can be applied to the gel in a given geometry having an orifice before the gel experiences structural failure and extrudes from the orifice.

In the practice of a coning treatment, a fluid shutoff treatment, or a squeeze cement treatment, the above-described gelation solution parameters are selected in a manner readily apparent to one skilled in the art to produce a gel satisfying the specific demands of the treatment. For example, squeeze cement treatments are often used to shut off formation zones in fluid communication with the well bore, in a manner requiring greater gel strength than many conformance improvement treatments. Therefore, gels prepared for squeeze cement treatments typically have a substantially greater structural strength and a higher yield pressure than gels prepared for conformance improvement treatments. Placement of the gelation solution for squeeze cement treatments, fluid shutoff treatments, and coning treatments, however, like conformance improvement treatments, comprises substantially the same steps of injecting the gelation solution into a well bore and displacing the solution into the treatment region where the gel is formed in situ.

Treatment regions in the formation within the scope of the present invention as applied to squeeze cement treatments include the near well bore, well bore tubing and casing, and well bore annuli. Treatment regions in the formation within the scope of the present invention as applied to coning treatments include matrix and anomalies such as those that provide fluid communication between a well bore and an aquifer or between a well bore and a gas cap.

The following examples demonstrate the practice and utility of the present invention, but are not to be construed as limiting the scope thereof.

EXAMPLES.

In examples 1 and 2, 50 cm$^3$ samples of gelation solutions are prepared by first preforming a crosslinking agent which encompasses mixing an organic chromium-(III) salt and a carboxylate anion in an aqueous solution. The resulting crosslinking agent is then added to an aqueous polymer solution to form the gelation solution. The polymer is polyacrylamide (PA) having a molecular weight of about 500,000 and initially having about 2.8 mole % of its amide groups hydrolyzed. The polymer concentration of the polymer solution is 6.0% by weight and the pH is 5.9. The organic chromium(III) salt solution is a chromium(III) triacetate solution, the carboxylate anion is lactate derived from sodium lactate, and the solvent is fresh tap water. The weight ratio of the polymer to the chromium(III) cation in the gelation solution is 44.0. No pH adjustment is performed during preparation of the samples. The amount of lactate present in the crosslinking agent, however, is varied among the samples as described below with respect to each example.

The samples are gelled by placing them in individual 120 cm$^3$ wide-mouthed bottles. The samples are nitrogen blanketed and the bottles are capped. The capped bottles are placed in an air bath at selected temperatures and the samples are aged for selected periods of time to form gels. While the samples are aging, the bottles are periodically inverted and the strength of the gels are observed as a function of time in accordance with the following gel strength code.

| Gel Strength Code | |
|---|---|
| Code* Letter | Gel Strength Characterization |
| A | No detectable gel formed. The gel appears to have the same viscosity (fluidity) as the original polymer solution and no gel can be visually detected. |
| B | High flowing gel. The gel appears to be only slightly more viscous than the initial relatively low-viscosity polymer solution. |
| C | Flowing gel. Most of the obviously detectable gel flows to the bottom upon inversion. |
| D | Moderately flowing gel. A small portion (about 5 to 15%) of the gel does not readily flow to the bottom upon inversion – usually characterized as a "tonguing" gel. |
| E | Barely flowing gel. The gel slowly flows to the bottom and/or a significant portion (>15%) of the gel does not flow to the bottom upon inversion. |
| F | Highly deformable nonflowing gel. The gel does not flow to the bottom upon inversion (gel flows to just short of reaching the bottom). |
| G | Moderately deformable nonflowing gel. The gel flows about halfway down to the bottom upon inversion. |
| H | Slightly deformable nonflowing gel. The gel surface only slightly deforms upon inversion. |
| I | Rigid gel. There is no gel-surface deformation upon inversion. |
| J | Ringing rigid gel. A tuning-forklike mechanical vibration can be felt after the gel is tapped. |
| S | Syneresis – expulsion of a water phase. |

*"+" or "–" are symbols that may be associated with a code letter to denote shades of gel strength characterization.

The experimental variables and the results for each example are set forth below.

example 1

Samples of gelation solutions are prepared in the above-described manner. Sample no, 1 is a control wherein no lactate is added to the chromium(III) triacetate solution during preparation of the crosslinking agent. The samples are gelled at a temperature of 60° C. The gel strengths for each sample are set forth below in Table 1 as a function of time.

TABLE 1

| | Sample No. | | | | | | |
|---|---|---|---|---|---|---|---|
| | 1 | 2 | 3 | 4 | 5 | 6 | 7 |
| | Crosslinking Agent | | | | | | |
| | $CrAc_3$ | $Cr(Lac)(Ac)_2$ | $Cr(Lac)_2(Ac)$ | $CrLac_3$ | $CrLac_4$ | $CrLac_5$ | $CrLac_6$ |
| wt % crosslinking agent in crosslinking agent solution | 10.0 | 9.95 | 11.1 | 12.3 | 15.7 | 19.1 | 22.6 |
| wt % Cr(III) in crosslinking agent solution | 2.27 | 2.0 | 2.0 | 2.0 | 2.0 | 2.0 | 2.0 |
| wt ratio polymer: crosslinking agent | 10.0 | 8.84 | 7.92 | 7.17 | 5.59 | 4.62 | 3.90 |
| ppm crosslinking agent in gelation solution | 5680 | 6380 | 7130 | 7880 | 10,100 | 12,300 | 14,500 |
| ppm Cr(III) in gelation solution | 1290 | 1280 | 1280 | 1280 | 1290 | 1290 | 1290 |
| Aging Time (Hrs.) | GEL STRENGTH CODE | | | | | | |
| 0 | A | A | A | A | A | A | A |
| 0.5 | C | B+ | A | A | A | A | A |
| 1.0 | C+ | C | B+ | A | A | A | A |
| 1.5 | D | D– | C | C | B+ | A | A |
| 2.0 | G | E+ | D | C+ | C | A | A |
| 2.5 | H+ | H | F | D | C | B+ | A |
| 3.0 | I | I | H | E | C+ | B+ | A |
| 4.0 | J | I | I | G+ | D | B+ | A |
| 5.0 | J | I | I | H | E | D– | A |
| 6.0 | J | J | I | H | F– | D | C– |
| 7.0 | J | J | I | H+ | G | D+ | C |
| 8.0 | J | J | I+ | I | H– | E+ | C+ |
| 12.0 | J | J | J– | I | I– | F+ | D |
| 24 | J | J | J | J– | I | H | F– |
| 48 | J | J | J | J– | I | H | F+ |
| 72 | J | J | J | J | I | H | G– |
| 96 | J | J | J | J | I | H | H– |
| 120 | J | J | J | J | I | H | H– |
| 168 | J | J | J | J | I | H | H– |
| 300 | J | J | J | J | I | H | H– |
| 600 | J | J | J | J | J | I | I– |

EXAMPLE 2

Samples of gelation solutions are again prepared in the above-described manner. Sample no. 1 is a control wherein no lactate is added to the chromium(III) triacetate solution during preparation of the crosslinking agent. The samples are gelled at a temperature of 70° C. The gel strengths for each sample are set forth below in Table 2 as a function of time.

TABLE 2

| | Sample No. | | | | | | |
|---|---|---|---|---|---|---|---|
| | 1 | 2 | 3 | 4 | 5 | 6 | 7 |
| | Crosslinking Agent | | | | | | |
| | $CrAc_3$ | $Cr(Lac)(Ac)_2$ | $Cr(Lac)_2(Ac)$ | $CrLac_3$ | $CrLac_4$ | $CrLac_5$ | $CrLac_6$ |
| wt % crosslinking agent in crosslinking agent solution | 10.0 | 9.95 | 11.1 | 12.3 | 15.7 | 19.1 | 22.6 |
| wt % Cr(III) in crosslinking agent solution | 2.27 | 2.0 | 2.0 | 2.0 | 2.0 | 2.0 | 2.0 |
| wt ratio polymer: crosslinking agent | 10.0 | 8.84 | 7.92 | 7.17 | 5.59 | 4.62 | 3.90 |
| ppm crosslinking agent in gelation solution | 5680 | 6380 | 7130 | 7880 | 10,100 | 12,300 | 14,500 |
| ppm Cr(III) in gelation solution | 1290 | 1280 | 1280 | 1280 | 1290 | 1290 | 1290 |
| Aging Time (Hrs.) | GEL STRENGTH CODE | | | | | | |
| 0 | A | A | A | A | A | A | A |
| 0.5 | C | C– | A | A | A | A | A |
| 1.0 | C+ | C+ | C | C– | A | A | A |
| 1.5 | I– | G– | G | D | D– | C– | A |
| 2.0 | J | I | I– | F | E | C | A |
| 2.5 | J | I+ | I | H | F | C+ | A |
| 3.0 | J | J | I | I | G+ | D | C |
| 4.0 | J | J | J | I | H | E+ | D– |
| 5.0 | J | J | J | I | I | F | D |
| 6.0 | J | J | J | I | I | G | E |
| 7.0 | J | J | J | I | I | H– | E |

TABLE 2-continued

| | Sample No. | | | | | | |
|---|---|---|---|---|---|---|---|
| | 1 | 2 | 3 | 4 | 5 | 6 | 7 |
| | | | | Crosslinking Agent | | | |
| | CrAc$_3$ | Cr(Lac)(Ac)$_2$ | Cr(Lac)$_2$(Ac) | CrLac$_3$ | CrLac$_4$ | CrLac$_5$ | CrLac$_6$ |
| 8.0 | J | J | J | I+ | I | H | E+ |
| 12.0 | J | J | J | J− | I | H+ | F |
| 24 | J | J | J | J | I+ | H+ | F+ |
| 48 | J | J | J | J | I+ | H+ | G |
| 72 | J | J | J | J | I+ | I | H |
| 96 | J | J | J | J | I+ | I− | H |
| 120 | J | J | J | J | J | I | H |
| 168 | J | J | J | J | J | I | H |
| 300 | J | J | J | J | J | I | I |
| 600 | J | J | J | J | J | J | J− |

The results of Examples 1 and 2 indicate that stable gels can be prepared having a substantial degree of gelation rate retardation by employing a chromium(III)/carboxylate complex crosslinking agent of the present invention in the gelation solution, wherein the crosslinking agent is preformed from an organic salt of chromium(III) and a selected carboxylate anion. Examples 1 and 2 further show that the degree of gelation retardation can be substantially increased in a controlled and predictable manner by increasing the molar ratio of the selected carboxylate anion to the chromium(III) cation in the gelation solution for given gelation solution components at a given temperature.

EXAMPLE 3

For purposes of comparison, two samples of gelation solutions numbered one and two are prepared and gelled in substantially the same manner as correspondingly numbered samples of Example 1 except that the crosslinking agent of the present example is formed from an inorganic chromium(III) salt, i.e., chromium(III) trichloride, rather than from the chromium(III) triacetate salt of Example 1. In both samples of the present example, complete gelation of the gelation solution is virtually instantaneous after addition of the crosslinking agent to the polymer solution. Accordingly, the chromium(III)/carboxylate complex crosslinking agents of the present invention employed in Examples 1 and 2 are shown to provide more controlled gelation than the prior art crosslinking agent of the present example.

While the foregoing preferred embodiments of the invention have been described and shown, it is understood that alternatives and modifications, such as those suggested and others, may be made thereto and fall within the scope of the present invention.

I claim:

1. A process for substantially reducing the permeability of a treatment region in a hydrocarbon-bearing formation below an earthen surface penetrated by a well bore, the process comprising:
    a) preparing a preformed chromium(III)/carboxylate complex crosslinking agent at an earthen surface by mixing,
        i) an organic chromium(III) salt containing a chromium(III) cation, and
        ii) a carboxylate salt having a carboxylate anion selected from the group consisting of polycarboxylates, alpha-hydroxy carboxylates, substituted derivatives thereof, and mixtures thereof;
    b) mixing a water-soluble crosslinkable polymer, said preformed complex crosslinking agent, and an aqueous solvent at said earthen surface to produce a gelation solution;
    c) injecting said gelation solution into a formation below said earthen surface via a well bore in fluid communication with a subterranean hydrocarbon-bearing formation;
    d) displacing said gelation solution into a treatment region of said formation; and
    e) gelling said gelation solution to substantial completion in said treatment region, thereby producing a gel that substantially reduces the permeability of said treatment region.

2. The process of claim 1 wherein said organic chromium(III) salt is chromium(III) acetate.

3. The process of claim 1 wherein said alpha-hydroxy carboxylate is selected from the group consisting of lactate, glycolate, salicylate, and mixtures thereof.

4. The process of claim 1 wherein the molar ratio of carboxylate anions to chromium(III) cations in said gelation solution is between about 0.5:1 and about 100:1.

5. The process of claim 1 wherein the molar ratio of carboxylate anions to chromium(III) cations in said gelation solution is greater than 3:1.

6. The process of claim 1 wherein said organic chromium(III) salt and said carboxylate anion are mixed in solution.

7. The process of claim 1 wherein said process is a conformance improvement treatment.

8. The process of claim 1 wherein said process is a squeeze cement treatment.

9. The process of claim 1 wherein said process is a coning treatment.

10. The process of claim 1 wherein said process is a fluid shutoff treatment.

11. The process for substantially reducing the permeability of a treatment region in a hydrocarbon-bearing formation below an earthen surface penetrated by a well bore, the process comprising:
    a) preparing a preformed chromium(III)/carboxylate complex crosslinking agent at an earthen surface by mixing,
        i) chromium(III) acetate salt containing a chromium(III) cation, and
        ii) a carboxylate anion selected from the group consisting of lactate, glycolate, salicylate, malonate, tartrate, citrate, substituted derivatives thereof, and mixtures thereof;
    b) mixing a water-soluble crosslinkable polymer, said preformed complex crosslinking agent, and an aqueous solvent at said earthen surface to produce a gelation solution;

c) injecting said gelation solution into a formation below said earthen surface via a well bore in fluid communication with a subterranean hydrocarbon-bearing formation;

d) displacing said gelation solution into a treatment region of said formation; and e) gelling said gelation solution to substantial completion in said treatment region, thereby producing a gel that substantially reduces the permeability of said treatment region.

12. A process for substantially reducing the permeability of a treatment region in a hydrocarbon-bearing formation below an earthen surface penetrated by a well bore, the process comprising:

a) preparing a preformed chromium(III)/carboxylate complex crosslinking agent at an earthen surface by mixing,
   i) an organic chromium(III) salt containing a chromium(III) cation, and
   ii) a polycarboxylate anion selected from the group consisting of malonate, tartrate, citrate, and mixtures thereof;

b) mixing a water-soluble crosslinkable polymer, said preformed complex crosslinking agent, and an aqueous solvent at said earthen surface to produce a gelation solution;

c) injecting said gelation solution into a formation below said earthen surface via a well bore in fluid communication with a subterranean hydrocarbon-bearing formation; d) displacing said gelation solution into a treatment region of said formation; and e) gelling said gelation solution to substantial completion in said treatment region, thereby producing a gel that substantially reduces the permeability of said treatment region.

13. The process of claim 12 wherein the molar ratio of polycarboxylate anions to chromium(III) cations in said gelation solution is between about 0.5:1 and about 100:1.

14. The process of claim 12 wherein the molar ratio of polycarboxylate anions to chromium(III) cations in said gelation solution is greater than 3:1.

15. The process of claim 12 wherein said organic chromium(III) salt and said polycarboxylate anion are mixed in solution.

16. The process of claim 12 wherein said process is a conformance improvement treatment.

17. The process of claim 12 wherein said process is a squeeze cement treatment.

18. The process of claim 12 wherein said process is a coning treatment.

19. The process of claim 12 wherein said process is a fluid shutoff treatment.

20. A process for substantially reducing the permeability of a treatment region in a hydrocarbon-bearing formation below an earthen surface penetrated by a well bore, the process comprising:

a) preparing a preformed chromium(III)/carboxylate complex crosslinking agent at an earthen surface by mixing,
   i) chromium(III) acetate salt containing a chromium(III) cation, and
   ii) a salt having a lactate anion;

b) mixing a water-soluble crosslinkable polymer, said preformed complex crosslinking agent, and an aqueous solvent at said earthen surface to produce a gelation solution;

c) injecting said gelation solution into a formation below said earthen surface via a well bore in fluid communication with a subterranean hydrocarbon-bearing formation;

d) displacing said gelation solution into a treatment region of said formation; and e) gelling said gelation solution to substantial completion in said treatment region, thereby producing a gel that substantially reduces the permeability of said treatment region.

21. The process of claim 20 wherein the molar ratio of lactate anions to chromium(III) cations in said gelation solution is between about 0.5:1 and about 100:1.

22. The process of claim 20 wherein the molar ratio of lactate anions to chromium(III) cations in said gelation solution is greater than 3:1.

23. The process of claim 20 wherein said organic chromium(lll) salt and said lactate anion are mixed in solution.

24. The process of claim 20 wherein said process is a conformance improvement treatment.

25. The process of claim 20 wherein said process is a squeeze cement treatment.

26. The process of claim 20 wherein said process is a coning treatment.

27. The process of claim 20 wherein said process is a fluid shutoff treatment.

* * * * *